UNITED STATES PATENT OFFICE.

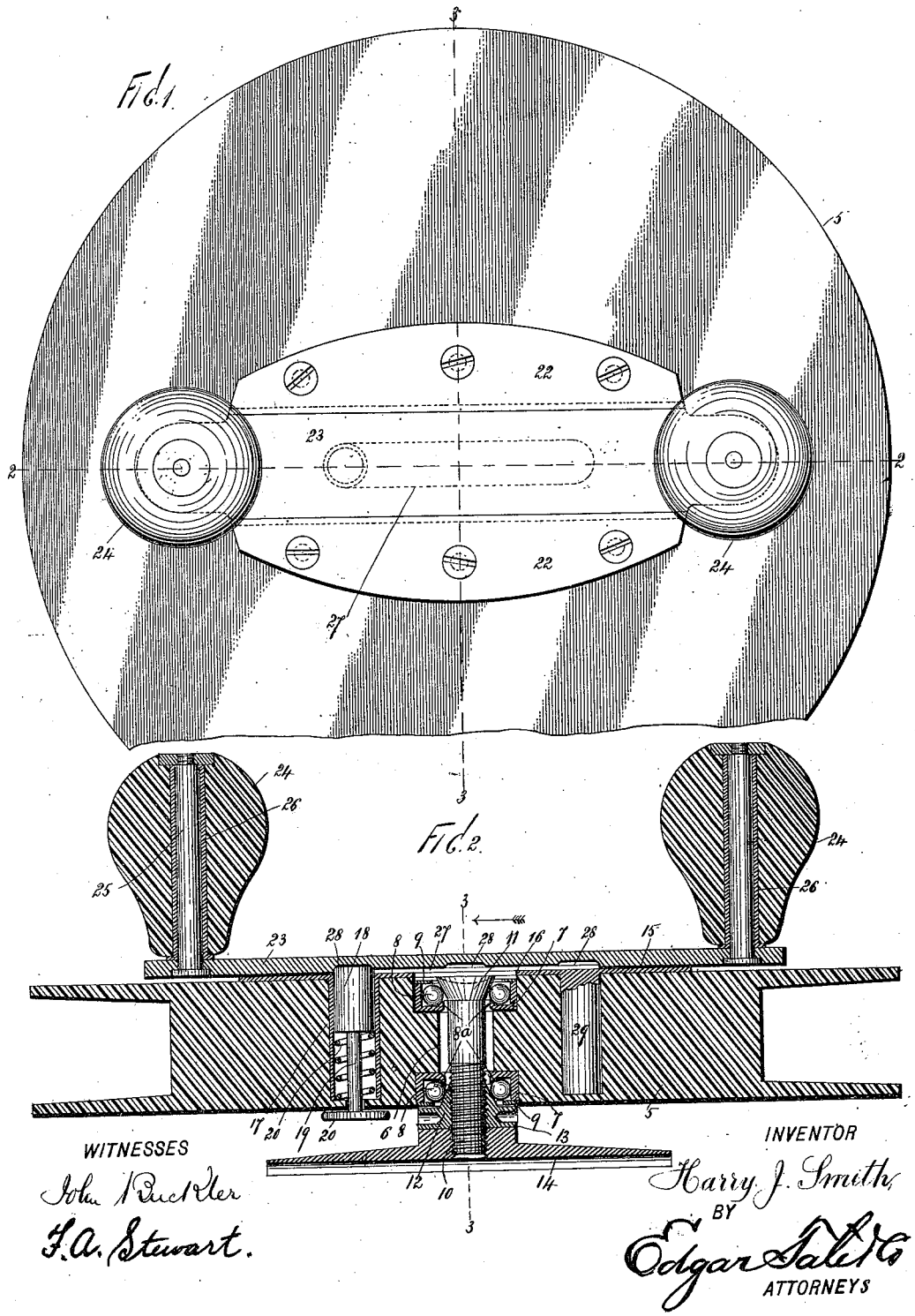

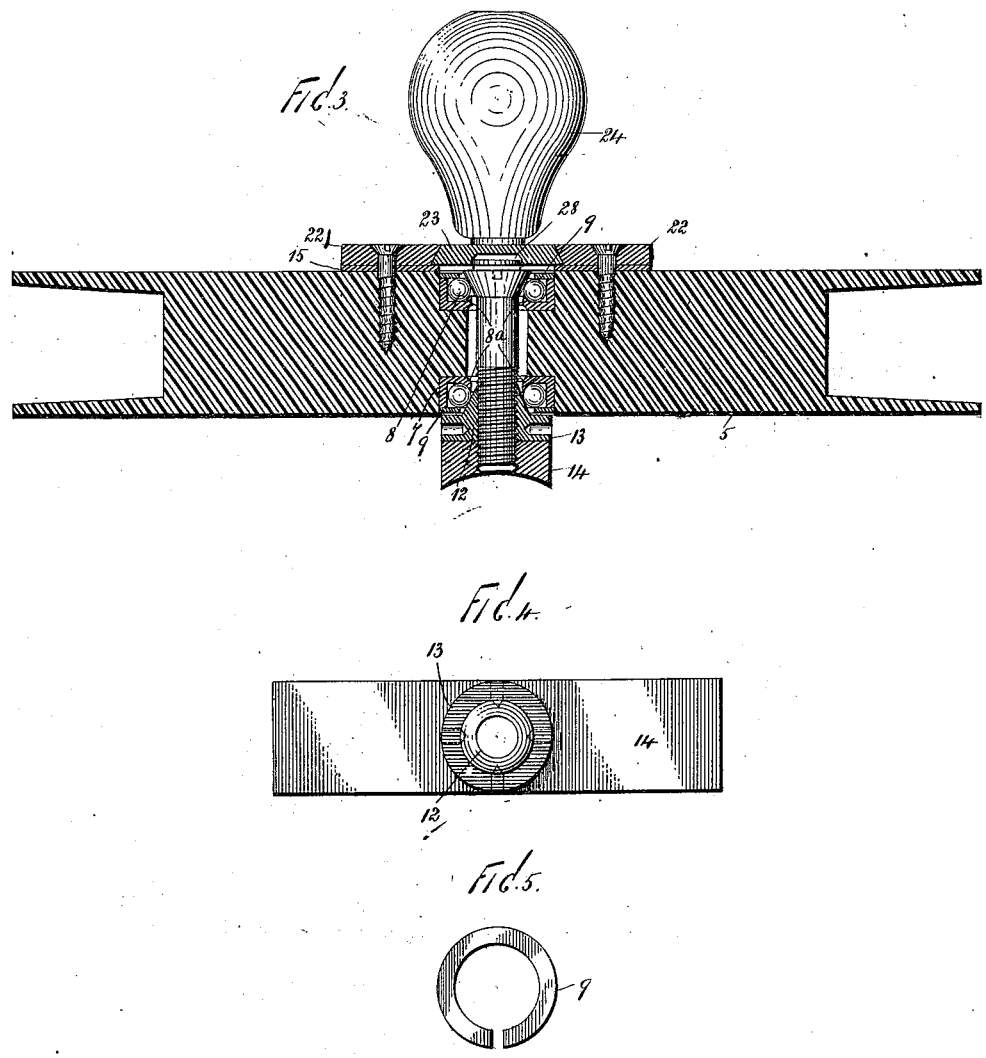

HARRY J. SMITH, OF NEW YORK, N. Y.

FISHING-REEL.

SPECIFICATION forming part of Letters Patent No. 630,632, dated August 8, 1899.

Application filed March 18, 1899. Serial No. 709,615. (No model.)

*To all whom it may concern:*

Be it known that I, HARRY J. SMITH, a citizen of the United States, residing at New York, in the county of New York and State of New York, have invented certain new and useful Improvements in Reels for Fishing-Lines, of which the following is a full and complete specification, such as will enable those skilled in the art to which it appertains to make and use the same.

This invention relates to reels for fishing-lines; and the object thereof is to provide an improved device of this class which is simple in construction and operation and which is provided with improved means for turning the spool of the reel by hand, so as to wind up the line, and which also possesses other novel and advantageous features of construction by which the operation is rendered more efficient; and with this and other objects in view the invention consists in the construction, combination, and arrangement of parts hereinafter described and claimed.

The invention is fully disclosed in the following specification, of which the accompanying drawings form a part, in which—

Figure 1 is an outside view of my improved reel; Fig. 2, a section on the line 2 2 of Fig. 1; Fig. 3, a section on the line 3 3 of Figs. 1 and 2; Fig. 4, a side view of a part of the device for connecting the reel with a pole, and Fig. 5 a similar view of a spring-washer which I employ.

In the drawings forming part of this specification the separate parts of my improvement are designated by the same numerals of reference in each of the views, and in the practice of my invention I provide a spool 5, of hard wood or similar material, which is provided with a central transverse bore 6, enlarged at both ends to form annular recesses 7, in each of which is mounted an annular casing 8, the sides of which are L-shaped in cross-section, and the inner flange of each is curved outwardly to form an annular lip 8ª, as clearly shown in Fig. 2, to form races in which are mounted ball-bearings 8, and mounted in said annular recesses 7 and closing the races in which the ball-bearings are mounted are annular spring-washers 9, one of which is shown in Fig. 5 and which serve to hold the balls in place.

A short screw-threaded shaft 10 is passed centrally through the annular recesses 7, as clearly shown in Fig. 2, and said shaft is provided at one end with a conical head 11, and at the opposite side of said spool the shaft 10 is screw-threaded and provided with a conical bearing 12, which is screwed thereto, and the head 11 of the shaft 10 and the conical bearing 12 operate in connection with the ball-bearings 8.

The conical bearing 12 is provided with an annular head 13, and screwed onto the shaft 10, adjacent to said bearing, is a reel-seat 14, of the usual form, and by means of which the reel is connected with the pole in the usual manner.

Secured to the spool 5 on the opposite side from the reel-seat is a plate 15, which is provided with a central opening 16 about the size of the annular recess in which the ball-bearing casing 7 is placed, and the plate 5 is provided at one side with a tubular casing 17, which passes almost through the spool 5, and in which is mounted a spring-operated plug 18, having a stem 19, which passes outwardly through the side of the spool adjacent to the reel-seat 14 and is provided with a button or head 20, and mounted on said stem 19 is a spiral spring 21, which serves to force the plug 18 outwardly through the plate 15.

Mounted on the outer side of the plate 15 are guide-plates 22, as shown in Figs. 1 and 3, and between these guide-plates is mounted a slide 23, as shown in Figs. 1 and 3, and the slide 23 is provided adjacent to each end with a handle 24, revolubly mounted on pins 25, which pass through tubular casings 26, secured in said handles.

In practice one of the handles 24 is preferably composed of dark-colored wood and the other of light-colored wood, or said handles may be painted, so as to distinguish one from the other, the object of this being to provide means for determining in which direction the slide 23 is to be moved when in its normal position.

The slide 23 constitutes a lever for turning the reel and is provided on its under or inner side with a longitudinal groove 27, (shown in dotted lines in Fig.1 and in full lines in Fig. 3,) and in the bottom of said groove are formed at the opposite ends thereof and at the center cavities or recesses 28, adapted to receive the end of the plug 18, which is beveled, as shown in Fig. 2, and the side walls of the cavities or recesses 28 are also beveled, as shown in said figure.

By moving the slide 23 longitudinally one end thereof is projected farther from the center of the spool and the other end moved toward the center, as will be readily understood, and the handle 24 which is on the end of said slide farthest from the center of the spool 5 is grasped in the operation of turning the spool to wind up the line. In this operation of the slide 23 the plug 18 is made to engage with either of the cavities or recesses 28 in the inner side of said slide, and said plug will serve to hold the slide in the desired position. When the said slide is in the position shown in Fig. 2, the ends thereof are of the same length, and either of the handles 24 may be employed in winding up the line, and either of said handles will give the same power to the slide or lever 23, with which they are connected; but the said slide or lever may be moved so that the plug 18 will engage with the central cavity or recess 28 or with the cavity or recesses 28 at the right of the device, as shown in Fig. 2, in which event one end of said slide or lever will be much longer than the other, as will be readily understood. I also mount in one side of the spool 5, as a counterbalance to the casing 17 and the plug 18, mounted therein, and the parts connected therewith, a weight 29, and this weight may be formed integrally with the plate 15, as shown in the drawings, or independently thereof.

My improved reel is simple in construction and operation and well adapted to accomplish the result for which it is intended, and it will be apparent that changes in and modifications of the construction described may be made without departing from the spirit of my invention or sacrificing its advantages.

Having fully described my invention, I claim as new and desire to secure by Letters Patent—

1. A reel, comprising a spool, a shaft passing therethrough on which said spool revolves, a reel-seat connected with one end of said shaft at one side of said spool, guide-plates connected with the opposite side of said spool, and a slide mounted between said guide-plates and provided at its opposite ends with handles, substantially as shown and described.

2. A reel, comprising a spool, a shaft passing therethrough on which said spool revolves, a reel-seat connected with one end of said shaft at one side of said spool, guide-plates connected with the opposite side of said spool, a slide mounted between said guide-plates and provided at its opposite ends with handles, and a spring-operated plug mounted in said spool and adapted to be projected from one side thereof, said plug being adapted to engage with cavities or recesses in said slide, substantially as shown and described.

3. A reel, comprising a spool mounted on a shaft and adapted to turn thereon, said spool being provided at one side with a plate, a spring-operated plug mounted in said spool at one side of the shaft and adapted to be projected through said plate, a slide mounted on said plate and provided with cavities or recesses adapted to receive the end of said plug, substantially as shown and described.

4. A reel, comprising a spool mounted on a shaft and adapted to turn thereon, said spool being provided at one side with a plate, a spring-operated plug mounted in said spool at one side of the shaft and adapted to be projected through said plate, a slide mounted on said plate and provided with cavities or recesses adapted to receive the end of said plug, said slide being provided at its opposite ends with revoluble handles, substantially as shown and described.

5. In a reel of the class described, a spool provided with a central shaft, ball-bearings between said spool and said shaft, said shaft being provided at one end with a reel-seat, and said spool being provided on the opposite side from the reel-seat with a transversely-movable slide or lever having handles at its opposite ends, and means for securing said slide or lever in the desired position, substantially as shown and described.

6. In a reel of the class described, a spool, a shaft passing therethrough, a spring-operated plug mounted in said spool at one side of said shaft, a slide or lever mounted on one side of said spool and provided with cavities or recesses adapted to receive the end of said plug, said slide or lever being provided at its opposite ends with handles, substantially as shown and described.

7. In a reel of the class described, a spool provided at one side with a transversely-movable slide or lever, a spring-operated plug mounted in one side of said spool and adapted to engage said slide or lever, and a counterbalance mounted in the opposite side of said spool, substantially as shown and described.

8. In a reel of the class described, a spool provided with a central shaft having a conical head at one end and screw-threaded at the other, a conical bearing mounted on said screw-threaded end, ball-bearings between said spool and said shaft, and held in place by said head and said conical bearing, said spool being provided at one side with a transversely-mounted slide or lever having handles at its opposite ends, substantially as shown and described.

9. In a reel of the class described, a spool provided with a central shaft having a conical head at one end and screw-threaded at the other, a conical bearing mounted on said screw-threaded end, ball-bearings between said spool and said shaft, and held in place by said head and said conical bearing, said spool being provided at one side with a transversely-mounted slide or lever having handles at its opposite ends, and with a spring-operated plug which is mounted therein and which operates in connection with cavities or recesses formed in said slide or lever, substantially as shown and described.

10. In a reel of the class described, a spool provided with a central shaft having a conical head at one end and screw-threaded at the other, a conical bearing mounted on said screw-threaded end, and ball-bearings between said spool and said shaft, and held in place by said head and said conical bearing, said spool being provided at one side with a transversely-mounted slide or lever having handles at its opposite ends, and with a spring-operated plug which is mounted therein and which operates in connection with cavities or recesses formed in said slide or lever, said spool being also provided on the side opposite said plug with a counterbalance-weight, substantially as shown and described.

11. In a reel of the class described, a spool, a shaft passing therethrough and provided with means for securing the reel to a pole, said spool being also provided at one side with a transversely-movable slide or lever, and with means for holding said slide or lever in the desired position, substantially as shown and described.

12. In a reel of the class described, a spool, a shaft passing therethrough and provided with means for securing the reel to a pole, said spool being also provided at one side with a transversely-movable slide or lever, and with means for holding said slide or lever in the desired position, said slide being also provided at its opposite ends with handles, substantially as shown and described.

13. A reel of the class described, having on one side thereof a transversely-movable slide or lever carrying the handle or handles of the reel, and adapted to be extended to alter the position of leverage of the operative handle of the reel, substantially as shown and described.

In testimony that I claim the foregoing as my invention I have signed my name, in presence of the subscribing witnesses, this 17th day of March, 1899.

HARRY J. SMITH.

Witnesses:
F. A. STEWART,
V. M. VOSLER.